United States Patent Office 2,806,858
Patented Sept. 17, 1957

2,806,858
NEW ANTICOAGULANTS

Zelimir Procházka, Prague, Czechoslovakia, assignor to Spofa, narodni podnik, Prague, Czechoslovakia, a corporation of Czechoslovakia No Drawing. Application August 11, 1954,
Serial No. 449,259

6 Claims. (Cl. 260—343.2)

This invention relates to new anticoagulants and a method of preparing same.

It is known that some derivatives of 4-hydroxycoumarin have a strong anticoagulant action. My present invention aims at new compounds of this kind, showing a particularly strong and prolonged effectiveness, and at a method of preparing such compounds.

I have found that it is possible to prepare esters of chromonyl-3-(4-hydroxycoumarinyl-3)-acetic acid by forming closed chain esters from α-(4-hydroxycoumarinyl-3)- β-salicylyl propionic acid, for instance, by means of an alkyl formiate and metallic sodium. The products are powerful anticoagulants and raticides.

The reaction takes place according to the following scheme:

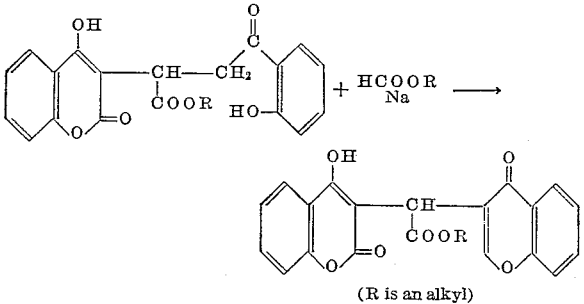

(R is an alkyl)

Example 15 gr. of α-(4-hydroxycoumarinyl-3)-β-salicylyl propionic acid ethyl ester were dissolved in 350 cc. of neutral dry ethyl formiate. Then 3.9 gr. of sodium were added in small pieces, while stirring and cooling (−5 to 0° C.). A visible reaction begun as late as after 3 hours, when the temperature rose to 0° C. An hour later, the reaction was nearly completed. The mixture was left for two days, and the precipitated slightly brownish sodium salt was sucked off. The cake, still wet, was dissolved in 1000 cc. of water, and the solution was acidified by adding 15 cc. of concentrated hydrochloric acid. The precipitate thus formed has been filtered off and dried at 100° C. A yield of 12.8 grams has been obtained. The dry body has been ground, extracted with 65 cc. of gasoline, and filtered. The extracted product melted at 165–166° C.

The yield was 12.3 grams. Having been recrystallized three times from a chloroform-gasoline mixture or from ethanol, the product showed a melting point of 177–178° C.

The analysis for $C_{22}H_{16}O_7$ (392.1) gives—

Calculated _____ 67.33% C, 4.11% H, 11.47%–$OC_2H_5$
Found _____ 67.60% C, 4.57% H, 10.72%–$OC_2H_5$ Equivalent found by titration: 389.

The ethylester of chromonyl-3-(4-hydroxycoumarinyl-3)-acetic acid has more powerful effectiveness than most anticoagulants known hitherto. Its effect lasts many days up to some weeks and may be shortened or broken by dispensing vitamin K.

Among other similarly active esters of the same acid, the following may be mentioned: methyl, propyl, isopropyl, n-butyl, isobutyl, and benzyl ester.

The anticoagulants according to the present invention may be used as such and in the form of their soluble salts, respectively.

Esters of chromonyl-3-(4-hydroxycoumarinyl-3)-acetic acid are also efficient raticides, as has already been stated. For instance, the ethyl ester is very effective, particularly in often repeated doses.

It is believed that my invention, as well as the advantages thereof, will be apparent from the foregoing detailed description. It will also be apparent that while I have shown and described a few examples only of my invention, changes may be made without departing from the spirit of the invention, as sought to be defined in the following claims.

I claim:

1. Method of preparing new anticoagulants, comprising reacting a lower saturated aliphatic alcohol ester of α-(4-hydroxycoumarinyl-3)-β-salicylyl propionic acid with a waterfree unsubstituted lower alkyl formiate and metallic sodium at low temperatures.

2. In the method according to claim 1, acidifying the obtained sodium salt of the ester of chromonyl-3-(4-hydroxycoumarinyl-3)-acetic acid to free the ester.

3. Ethyl ester of chromonyl-3-(4-hydroxycoumarinyl-3)-acetic acid.

4. The watersoluble sodium salt of chromonyl-3-(4-hydroxycoumarinyl-3)-acid ethyl ester.

5. A raticide containing an ester of chromonyl-3-(4-hydroxycoumarinyl-3-acetic acid with a lower saturated aliphatic alcohol.

6. A raticide containing the sodium salt of an ester of chromonyl-3-(4-hydroxycoumarinyl-3)-acetic acid with a lower saturated aliphatic alcohol.

References Cited in the file of this patent
FOREIGN PATENTS 568,858    Great Britain _____ Apr. 24, 1955

OTHER REFERENCES

Elderfield: "Heterocyclic Compounds," vol. 2, pp. 230–232, (1951).